US005804243A

United States Patent [19]
Loh et al.

[11] Patent Number: 5,804,243
[45] Date of Patent: Sep. 8, 1998

[54] PROCESS FOR MAKING LOW-FAT, CAKE DONUTS

[75] Inventors: Jimbay Loh, Peekskill; Shun Ku, Chappaqua; Joaquin C. Lugay; Richard N. McArdle, both of Mahopac; Helena S. Soedjak, North Tarrytown, all of N.Y.

[73] Assignee: CPC International Inc., Englewood Cliffs, N.J.

[21] Appl. No.: 723,595

[22] Filed: Oct. 1, 1996

Related U.S. Application Data

[63] Continuation of Ser. No. 362,729, Dec. 23, 1994, abandoned.

[51] Int. Cl.⁶ .................................................. A21D 10/04
[52] U.S. Cl. ........................ 426/552; 426/573; 426/94
[58] Field of Search ........................... 426/94, 551–553, 426/556, 573, 575–576, 499

[56] References Cited

U.S. PATENT DOCUMENTS

| | | | |
|---|---|---|---|
| 1,151,356 | 8/1915 | Gottschalk | 426/505 |
| 3,042,527 | 7/1962 | Cantrell | 426/556 |
| 3,638,583 | 2/1972 | Goodier et al. | 249/122 |
| 3,727,875 | 4/1973 | Downing | 249/121 |
| 4,431,681 | 2/1984 | Hegedus et al. | 426/553 |
| 4,451,490 | 5/1984 | Silverman et al. | 426/553 |
| 4,461,782 | 7/1984 | Hodgson et al. | 426/62 |
| 4,503,083 | 3/1985 | Glicksman et al. | 426/553 |
| 4,526,799 | 7/1985 | Glicksman et al. | 426/553 |
| 4,701,340 | 10/1987 | Bratton et al. | 426/511 |
| 4,746,526 | 5/1988 | Carroll | 426/496 |
| 4,749,581 | 6/1988 | Gorsuch et al. | 426/505 |
| 4,824,683 | 4/1989 | Hodgson et al. | 426/62 |
| 4,937,086 | 6/1990 | Prosise | 426/549 |
| 5,028,442 | 7/1991 | Zemelman et al. | 426/303 |
| 5,109,758 | 5/1992 | Voegtlin | 99/443 |
| 5,133,984 | 7/1992 | Murphy et al. | 426/496 |
| 5,225,222 | 7/1993 | Cha et al. | 426/89 |
| 5,236,724 | 8/1993 | Burger | 426/94 |
| 5,262,187 | 11/1993 | Hahn | 426/552 |
| 5,277,925 | 1/1994 | Emanuelson et al. | 426/552 |
| 5,403,610 | 4/1995 | Murphy et al. | 426/575 |

OTHER PUBLICATIONS

Tressler 1975 Food Products Formulary vol. 2. AVI Publishing Co. Inc. Westport CT pp. 109–114.

Pyler 1988 Baking Science & Technology Third Ed. vol. II Sosland Publishing Co. Kansas City MO pp. 1028–1036.

*Primary Examiner*—Carolyn Paden
*Attorney, Agent, or Firm*—Norris, McLaughlin & Marcus, P.A.

[57] ABSTRACT

A chemically-leavened, self-sustaining cake donut dough is prepared which contains from 20–30% of a thermally-reversible gel. The dough is formed into donut shapes and baked in an oven within 10 minutes. The gel is comprised of 80–95% water, 5–20% insoluble, water-binding fiber and 0.2–2% thermally-reversible hydrocolloid gelling agent.

12 Claims, No Drawings

PROCESS FOR MAKING LOW-FAT, CAKE DONUTS

This application is a continuation of U.S. Ser. No. 08/362,729, filed Dec. 23, 1994, now abandoned.

FIELD OF THE INVENTION

This invention relates to the production of low-fat (less than 10%) cake donuts. As a result of their formulation and processing, conventional donuts have a high fat content and a high caloric content. Heretofore, donuts have been made by frying a donut batter or dough which itself may contain a significant amount of fat.

Commercially, donuts fall into two broad categories: cake donuts, leavened by a baking powder chemical reaction which produces carbon dioxide, and yeast-raised donuts, leavened by yeast enzymes which react with sugar during fermentation to produce carbon dioxide and ethyl alcohol. Conventional cake donuts are prepared from a batter which is deposited into hot oil for frying. Yeast-raised donuts are produced from a dough which is permitted to ferment before being fried in hot oil.

SUMMARY OF THE INVENTION

A low-fat, chemically-leavened cake donut is prepared by formulating a self-sustaining, soft (low modulus) dough which contains from 20% to 30% of a thermally-reversible, fiber-containing gel, forming the dough into donut-shaped pieces and baking the dough pieces. The moisture content of the dough and the resulting donut is maintained at a relatively high level, before, during and after baking.

The donuts produced in accordance with this invention are well-suited for being coated or enrobed with a coating material such as chocolate. As the cake donuts of this invention have been found to pick up less coating material than conventional cake donuts, the coated cake donuts of this invention will be further reduced in both fat content and calories, as compared to conventional coated donuts. The coating has also been found to maintain the relatively high moisture content of baked donuts of this invention.

All percents and ratios used in describing and claiming this invention are by weight.

DETAILED DESCRIPTION OF THE INVENTION

This invention is based on a unique formulation which enables the commercial production of low-fat, baked, cake donuts. A self-sustaining, low-modulus dough having a moisture content of 20–30%, preferably 25–30%, is prepared by combining 18 to 35%, preferably 20–30%, of a thermally-reversible gel, 30–60% flour, 10–30% sugars and chemical leavening agents. In addition, the dough may contain other commonly-used donut ingredients such as syrups, shortening, oil, emulsifier, egg yolk, milk solids, dough conditioners, flavor, color, etc. The dough formulations used to make the cake donuts of this invention will typically have a wheat gluten content of about 4 to 5% which is lower than the gluten content of doughs used for yeast-raised donuts.

The chemical leavening agents used in the dough formulations of this invention will include a leavening salt, such as sodium bicarbonate, and a combination of fast-acting and slow-acting baking acids. Among the fast-acting acids are monocalcium phosphate and certain sodium acid pyrophosphates. Among the slow-acting acids are sodium aluminum phosphate. Moderate-acting acids such as glucono-delta lactone and certain sodium acid pyrophosphates. The appropriate combination of baking acids will be readily arrived at by skilled bakers in view of the teachings of this invention. Typically the total leavening agents will be from 1 to 5% of the dough, with the leavening salts being 0.3 to 2% and the leavening acids being from 0.5 to 4.7 by weight of the dough. The dough formulations of this invention will usually be essentially free of yeast.

The dough of this invention is formulated to have a viscosity 1200–2700 poise (120,000–270,000 centipose) and an elastic modulus of 14,000–25,000 dyne/cm$^2$. The doughs of this invention are less stiff than conventional bread doughs which have an elastic modulus in excess of 25,000 dyne/cm$^2$. Conventional cake donuts are made from batters which flow and are not self-sustaining and which typically have a modulus of less than about 10,000 dyne/cm$^2$. The preferred modulus for the doughs of this invention is 16,000 to 20,000 dyne/cm$^2$, which is sufficient to enable the dough to be sheeted, stamped, extruded or otherwise formed into donut shapes that will retain their form while supported on a flat surface (i.e. no mold is needed), such as during conveyor transport and/or during the initial stages of baking. The dough remains self-sustaining during the initial stages of baking primarily due to the presence of the water-binding, heat-reversible gel component having a melt temperature of at least 40° C. By the time the dough is sufficiently heated that the thermally-reversible gel melts moisture release, dough expansion and crumb structure development in the dough has progressed sufficiently to support and retain a leavened, porous structure.

The values for the dough viscosity and elastic modulus set forth above were measured using a Controlled Stress Rheometer manufactured by Carri-Med of Surrey, England. The conditions at which these values were obtained are as follows: 4cm diameter parallel plates set with a 1.5 mm gap, a temperature of 66° C., a constant torque of 30,000 dyne× cm, an angular amplitude of 5×10$^{-3}$ radians, and a frequency of 1 hertz.

The thermally-reversible gel component of the dough is comprised of 80–95%, preferably 85–90%, water; 5–20%, preferably 8–12%, of insoluble water-binding fiber and 0.2–2%, preferably 0.4–1%, of thermally-reversible, hydrocolloid gelling agent. Typically, the ratio of hydrocolloid to fiber will be 1:10–30, preferably 1:15–25. The gel may be prepared by combining the water, hydrocolloid and fiber and mixing at a temperature above the gelling temperature of the hydrocolloid for at least several minutes and then cooling the mix to below the gelling point of the hydrocolloid. Typically, mixing is done at 70°–100° C., preferably 80°–100° C. The mixture may then be cooled to below about 20° C., preferably below 10° C.

The insoluble fiber which may be employed in this invention may be any edible plant fiber material, including powdered cellulose (at least 95% insoluble fiber). Fiber derived from cereal grains is also suitable for use in this invention. Oat fiber, which contains a relatively-high level (at least 85%) of insoluble cellulose fiber, soy fiber and wheat fiber should be useful in the practice of this invention. The fiber particles will typically have an average particle size of between about 10 and 200 microns, preferably between 80 and 120 microns. The preferred fibers will be those with high water holding capacity. Water holding capacity can be affected by the physical structure of the fibers. It has been found that powdered alpha cellulose with fibers in the form of hollow tubes and having a water binding capacity of at least 6 g of water per gram of fiber, preferably at least 9 grams of water per gram of fiber, are highly suitable for use in this invention.

The thermally-reversible, gelling hydrocolloid for use in this invention should have a gelling point in excess of 40° C. (104° F.). Agar is a preferred hydrocolloid for use in this invention. Other thermally-reversible polysaccharide gelling hydrocolloids such as pectin, carrageenan, starch and the like are also useful as are non-saccharide gelling agents such as gelatin.

When forming the dough, the gel preparation may be combined with any liquid ingredients (e.g., water, syrups, liquid flavors) prior to combining this mix with a blend of the dry ingredients (e.g., flour, sugar, leavening agents, salt, milk solids, dried egg yolk, shortening, etc.). Mixing of the total dough formulation is continued until a uniform soft, but self-sustaining, dough is obtained. The dough is then preferably sheeted and stamped to form donut-shaped dough pieces. These pieces are then placed on a flat, foraminous baking surface, such as a wire screen conveyor, and baked at a temperature of from 375° F. (190.5° C.) to 425° F. (218.3° C.). Preferably baking takes place within a relatively short period of time (e.g., less than 10 minutes, preferably less than 5 minutes). An air impingement oven will be desirable as this equipment results in short baking times.

In order to prevent undersirable crust formation during baking, which might preclude proper expansion and structure formation, a high surface moisture content must be maintained for the dough at least during the initial stages of baking. Surface moisture is therefore added to the dough. Preferably, the dough is sprayed with water as it passes into the oven. Desirably, the oven is also equipped with steam and/or water injectors for adding moisture to the oven during at least the first half of the baking cycle. During baking, the moisture content of the donut is reduced from the moisture content of the raw dough by less than 8, preferably less than 5, percentage points (e.g. total moisture reduced from about 28% to about 24%) The moisture content of the donut therefore is from 12% to 30%, preferably from 20% to 30%.

After baking, the donut may again be surface sprayed, typically top only, with water and thereafter surface dried by hot air, typically having a temperature of 250°–400° F. These steps are particularly desirable if the donut is to be coated (e.g., top-coated or enrobed), such as with a chocolate frosting, or if the donut is to be immediately handled, as the surface-spraying and drying will produce a surface to which coatings have increased adherence and a surface which has increased rigidity.

Desirably, the post-bake water spray increases the moisture content of the donut by several percentage points and typically brings the total moisture level up to at least 28%, preferably at least 32%. Surface drying of the sprayed donut should reduce total moisture content by 1 to 4, preferably about 2–3, percentage points.

The donuts should then be cooled, such as by being held at ambient temperature for 15 minutes, or by being passed through a cooking tunnel. If the donuts are to be enrobed, they may then be dipped into a melted and tempered enrobing medium, such as a chocolate frosting, and then cooled to ambient temperature. In the case of chocolate coatings, the cooling temperature profile is consistent with the principles of chocolate manufacturing which are well known to those skilled in the art.

As noted previously, the formulation of this invention enables the production of a baked donut. The avoidance of a frying step will reduce the fat content of the cake donut of this invention to below about 8%, preferably below about 6%. The fat content of conventional fried cake donuts is typically about 18–25%. In the case of frosted donuts, the fat content per donut is further reduced as the baked donuts of this invention pick up at least 10% less, typically about 15% less coating than conventional fried donuts.

The dough formulations of this invention will usually contain about 2–6% total fat, the total fat being comprised of added emulsifier, egg yolk or other fat-containing ingredients. The batter for conventional cake donuts also have a fat content of about 2–6%.

EXAMPLE

A cake donut dough formulation is prepared with the following composition:

| Ingredient | Parts By Weight |
| --- | --- |
| Cake Donut Flour | 868.9 |
| Water | 551.0 |
| Sucrose | 193.8 |
| Fructose | 188.0 |
| Dextrose | 24.9 |
| Alpha Cellulose Powder | 60.0 |
| Agar | 2.9 |
| High Fructose Corn Syrup | 45.0 |
| Dried Egg Yolk | 30.0 |
| Vegetable Shortening | 30.0 |
| Soybean Oil | 65.1 |
| Leavening Agents | 52.2 |
| Non-Fat Milk Solids | 51.2 |
| Flour Soy & Potato | 45.4 |
| Mono, Diglyceride Emulsifier | 21.7 |
| Other Emulsifiers | 18.1 |
| Salt | 16.3 |
| Liquid Flavor & Color | 24.0 |
| Gums | 2.3 |
| Flour Enrichment | 2.3 |
| Potassium Sorbate | 2.0 |
| Lecithin | 1.5 |
| | 2296.6 |

A cellulose-agar gel is prepared by adding agar to the boiling water component, boiling for two minutes, allowing the solution to cool to between 180°–190°F. (82.2°–87.8° C.) and then adding the powdered alpha cellulose. The mixture is cooled to 0°–4° C., at which temperature the mixture forms a rigid gel. Any weight loss from water evaporation is replenished at this time. The liquid flavor an the high-fructose corn syrup are added to the cooled gel and mixed in. Then the prepared gel is held at 0°–4° C. for subsequent use.

The shortening and mono-, diglyceride emulsifier are melted together and held. The dry ingredients (e.g., flour, sugar, leavening agents, emulsifiers, etc.) are mixed together and then the melted, shortening-emulsifier blend is added with additional mixing.

The gel is then added to the mixture of dry ingredients and mixing is continued at low speed until a homogeneous dough is produced. The dough is then beaten in the same mixer at medium speed for about 1.5 minutes or until the dough first begins to stick to the sides of the mixer. The dough is then removed from the mixer and placed with excess coating flour, onto a flat surface.

The dough has a fat content of about 5% a moisture content of about 27.7% and a viscosity of 1,750 poise and an elastic modulus of 18,375 dyne/cm$^2$ at 66° C. The dough is then punched to remove excess internal gas, and rolled into a sheet approximately 1 cm thick. Circles of dough are cut from the sheet with circular cutters and cut again to create an internal hole in order to create a donut-shaped dough portion.

Each dough portion is then sprayed (top spray) with about 5 g of water, of which only about 0.5 g penetrates or remains on the surface. The donut moisture is raised to about 28%. The donut is then baked for about 5 minutes at 205° C. in an air impingement oven fitted with a device which is able to inject live steam into the oven in order to keep the humidity within the oven at a high level, typically 70–90% relative humidity.

After baking each donut, which has a moisture content of about 24%, each donut is cooled to below 190° C. and sprayed from above with from 5–10 g of water at which point the moisture level for the donut rises to about 34%. The donuts are then surface-dried in a second impingement oven at 204° C. for about 1.33 minutes thereby reducing the moisture content to about 32%. The surface-dried donuts are then tempered by holding for about 15 minutes at 20°–25° C. and moderate relative humidity of about 40–60%. After tempering the moisture content of the donut has dropped to about 28% and the total fat content of the donut is about 7% (acid hydrolysis-hexane extraction method). In comparison to a commercial, fried, donut having a weight of 57 g and containing about 12.2 g of fat, a 55 g donut of this invention contains only 3.3 g of fat, a 73% reduction. At this point the donuts may be coated by dipping into a melted chocolate coating at about 43° C. and then cooling to set the coating.

The chocolate-enrobed donuts of this invention have a total fat content of about 8.5 g and are comprised of a 55 g donut and a coating of 13 g, the coating containing about 39.5% total fat. Comparable, commercial, fried, chocolate-enrobed cake donuts have been found to be comprised of a 57 g donut and a coating of 15 g resulting in a total fat content of 19.2 g. The enrobed donut of this invention represent a fat reduction of about 56%. When compared to commercial, chocolate-enrobed donuts, the coated donuts of this Example were judged to be equally acceptable (i.e., no statistical difference at 95% confidence level) after both one and three days from production.

We claim:

1. Method for producing a low-fat, chemically-leavened, cake donut comprising the steps of:

(a) preparing a thermally-reversible gel comprised of 80–95% water, 5–20% of insoluble, water binding fiber and 0.2–2% of thermally-reversible, hydrocolloid gelling agent;

(b) preparing a self-sustaining, low modulus donut dough having a moisture content of from 25–30% by weight, said dough comprised of from 20–30% of the gel of step (a), from 30–60% flour, from 10–30% sugars, and chemical leavening agents in an amount effective to leaven the dough throughout a baking operation, wherein the dough has a viscosity of 1,200–2,700 poise and a modulus of from 14,000 to 25,000 dyne/cm$^2$;

(c) forming the dough into self-sustaining donut-shaped pieces;

(d) baking the dough pieces in a preheated oven in less than 10 minutes at a temperature of from 375° F. to 425° F. with the moisture content of the dough surface during the initial stages of baking being sufficient to retard crust formation.

2. The method of claim 1 wherein after baking, water is sprayed onto the surface of the donut thereby increasing the moisture content of the donut by at least 2% and thereafter the wetted surface of the donut is dried.

3. The method of claim 2 wherein surface drying of the wetted donut is effected in an air impingement oven.

4. The method of claim 2 wherein the surface dried donut is then tempered and then coated with a melted chocolate frosting.

5. The method of claim 1 wherein the oven is an air impingement oven.

6. The method of claim 1 wherein the moisture content of the dough during baking is maintained by spraying water onto the surface of the dough pieces prior to the dough pieces entering the oven and/or injecting moisture into the oven during the baking cycle.

7. The method of claim 1 wherein the thermally-reversible hydrocolloid gelling agent is selected from the group consisting of agar, carrageenan, starch and gelatin.

8. The method of claim 1 wherein the thermally-reversible, hydrocolloid gelling agent is agar.

9. The method of claim 1 wherein the insoluble, water-binding fiber is plant fiber having a high water-binding capacity.

10. The method of claim 9 wherein the fiber is powdered alpha cellulose.

11. The method of claim 1 wherein the dough pieces are baked while being supported on a foraminous screen.

12. Method for producing a low-fat, chemically-leavened, cake donut comprising the steps of:

(a) preparing a thermally-reversible gel comprised of 85–90% water, 8–12% of powdered alpha cellulose, and 0.4–1% of agar;

(b) preparing a self-sustaining, low modulus donut dough having a moisture content of from 25–30% by weight, said dough comprised of from 20–30% of said gel of step (a), from 30–60% flour, from 10–30% sugars, and chemical leavening agents in an amount effective to leaven the dough throughout a baking operation, wherein the dough has a viscosity of 1,200–2,700 poise and a modulus of from 16,000 to 20,000 dyne/cm$^2$;

(c) forming the dough into self-sustaining donut-shaped pieces;

(d) baking the dough pieces while supported on a flat surface in a preheated oven in less than 10 minutes at a temperature of from 375° F. to 425° F. with the moisture content of the dough surface during the initial stages of baking being sufficient to retard crust formation.

* * * * *